May 6, 1958 T. HINDMARCH 2,833,153
POWER TRANSMISSION MECHANISMS
Filed Aug. 7, 1953 5 Sheets-Sheet 1
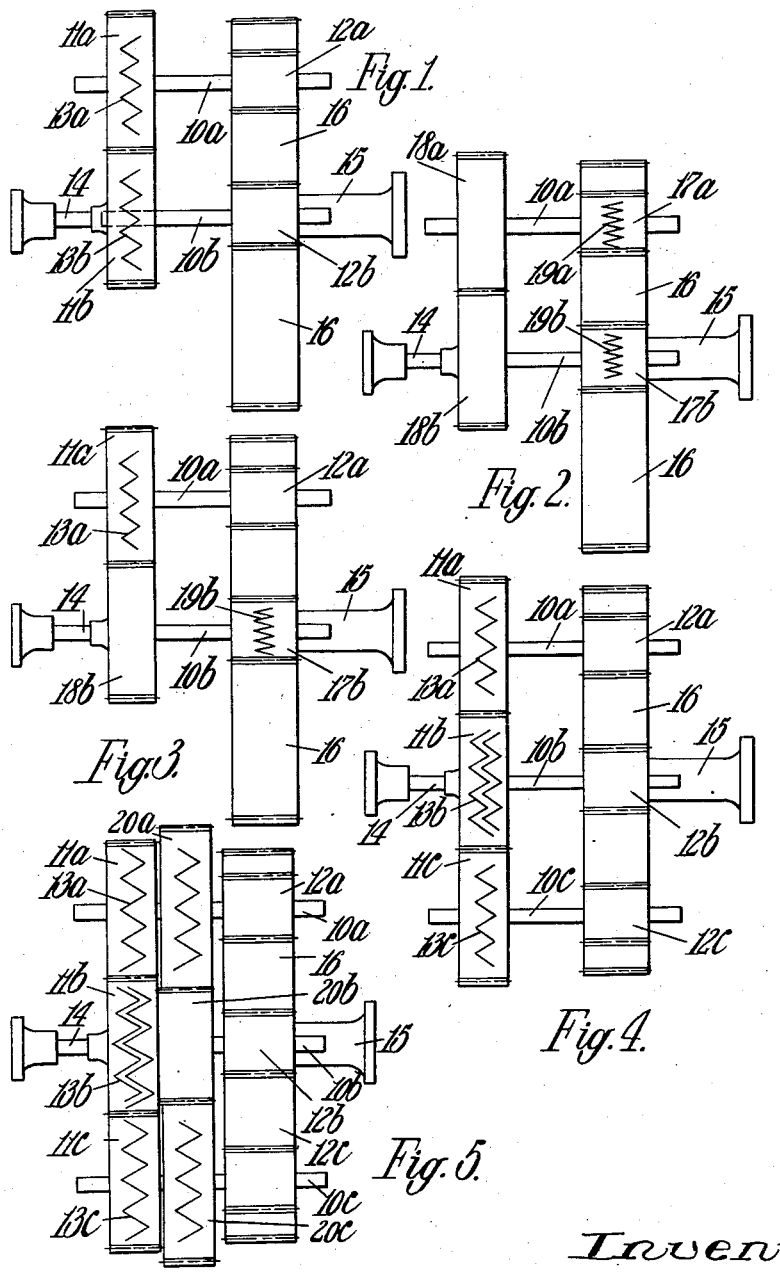

May 6, 1958  T. HINDMARCH  2,833,153
POWER TRANSMISSION MECHANISMS
Filed Aug. 7, 1953  5 Sheets-Sheet 2

Inventor
T. Hindmarch
By Elison Downing Seebold
Attys.

May 6, 1958 T. HINDMARCH 2,833,153
POWER TRANSMISSION MECHANISMS
Filed Aug. 7, 1953 5 Sheets-Sheet 3

Inventor
T. Hindmarch
By Hascock Downing Seebold
Attys.

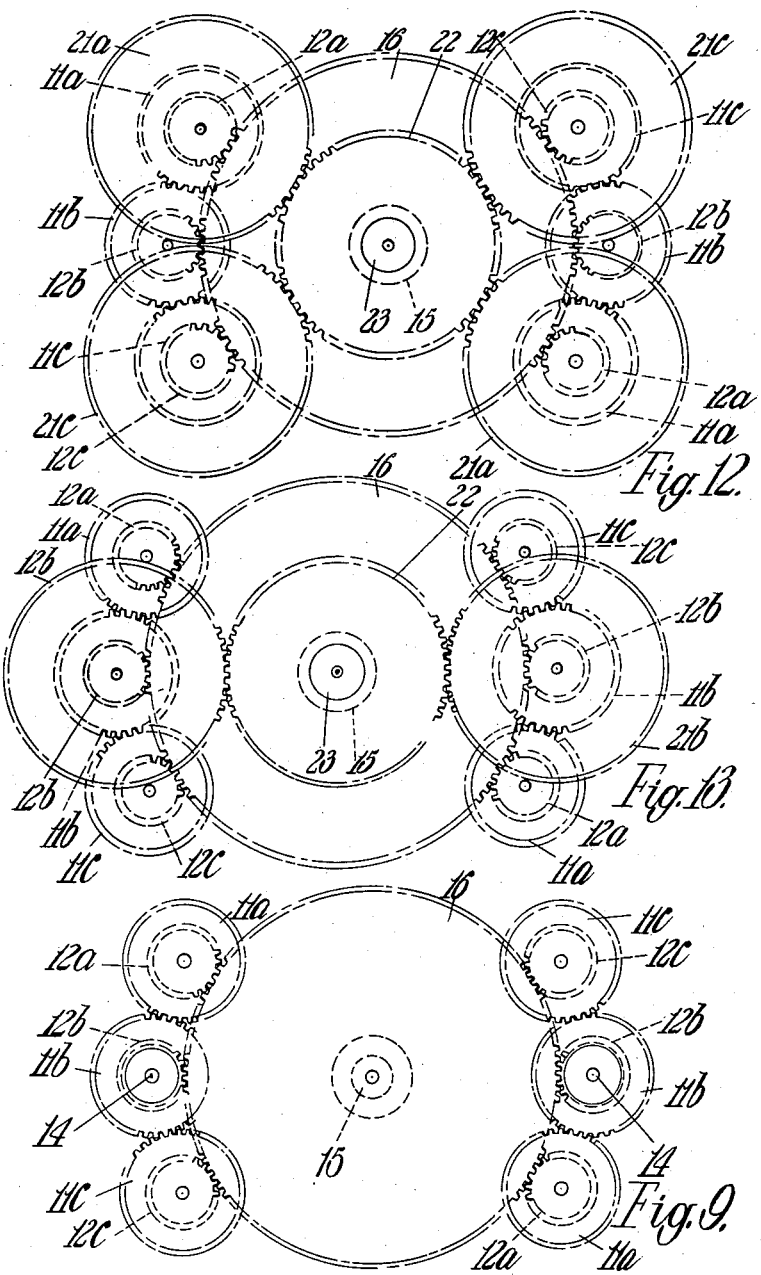

May 6, 1958 T. HINDMARCH 2,833,153
POWER TRANSMISSION MECHANISMS
Filed Aug. 7, 1953 5 Sheets-Sheet 5
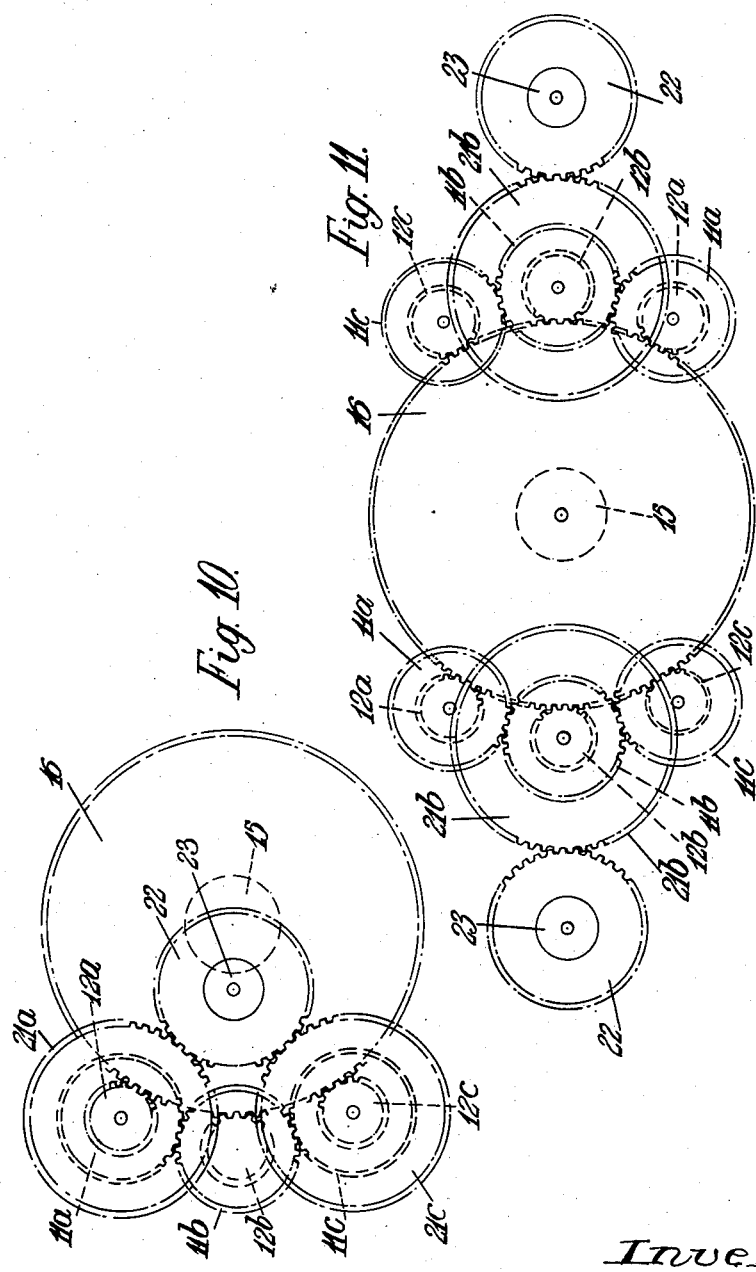
Inventor
T. Hindmarch United States Patent Office 2,833,153
Patented May 6, 1958

2,833,153

POWER TRANSMISSION MECHANISMS

Thomas Hindmarch, Chesham, England

Application August 7, 1953, Serial No. 372,991

Claims priority, application Great Britain
August 21, 1952

7 Claims. (Cl. 74—331)

This invention relates to reverse direction and/or variable ratio power transmissions primarily for use in ships, locomotives and heavy vehicles, while the object of the invention is to provide such gears which are compact and easily operable.

The invention consists in power transmission gear comprising at least one unit comprising at least two parallel intermediate shafts, at least one input pinion on each intermediate shaft engaging at least one other such input pinion, an output pinion on each intermediate shaft free of other such output pinions, friction clutch means on each intermediate shaft for drivingly connecting a pinion with said intermediate shaft, combined with an output shaft having thereon a common output toothed wheel with which the said output pinions on the intermediate shafts engage and input shaft means having driving means thereon driving at least one of the input pinions, all of the pinions not associated with clutch means being fast on their respective shafts.

Figure 6:
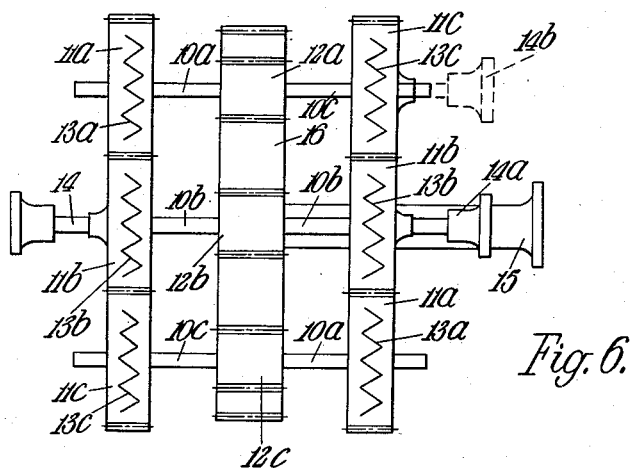
Figure 14:
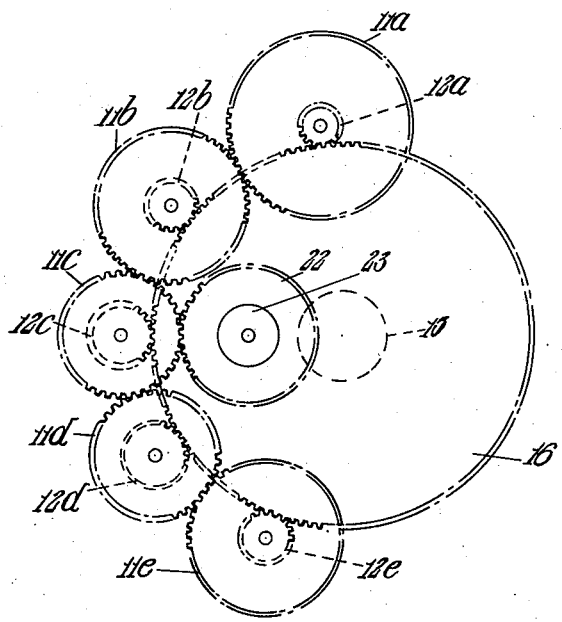
Figure 7:
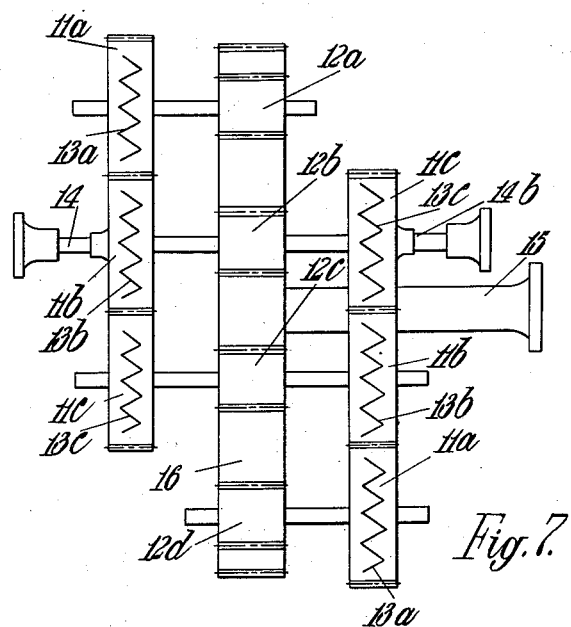
Figure 8:
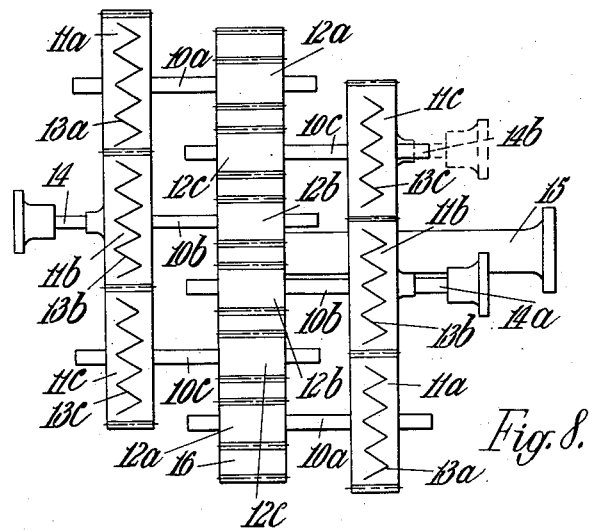

The accompanying diagrammatic drawings show, by way of example only, a number of embodiments of the invention in which:

Figures 1, 2 and 3 are plans of alternative arrangements of gears having two intermediate shafts, Figures 4 and 5 are plans of arrangements having one input shaft and three intermediate shafts, Figures 6, 7 and 8 are plans of arrangements having two input shafts, Figure 9 is an elevation showing two diametrically opposed units of the kind described in reference to Figure 4, Figure 10 is an elevation showing a further gear having a single unit driven from one input shaft, Figure 11 is an elevation showing a further gear having two units driven from two input shafts, Figures 12 and 13 are elevations of two further arrangements having two units driven from one input shaft, while, Figure 14 is a construction showing a multi-speed ratio gear of one unit driven from one input shaft.

In one of the simplest forms of construction in accordance with the invention and as shown in Figure 1, there is only one gear unit which has two parallel intermediate shafts 10a, 10b each shaft being provided with one pinion 11a, 11b which is free on its shaft and another pinion 12a, 12b which is fixed on its shaft. Associated with each of the free pinions and their respective shafts is a clutch means 13a, 13b preferably of the fluid pressure operated friction type such as described in British Patents Nos. 382,865 and 438,563, so arranged that the free pinions may be coupled to their respective intermediate shafts alternatively or decoupled from the same as required. The free pinions are constantly in mesh and therefore, when one of them is driven for example by the input shaft 14 attached coaxially thereto, the intermediate shafts may be made to rotate in either direction by engaging either one or other of the clutches 13a or 13b.

The drive from the intermediate shafts 10a, 10b is imparted to the output shaft 15 by means of an output toothed wheel 16 mounted thereon and engaging the fixed pinions 12a, 12b. By selectively engaging the clutches 13a, 13b the output shaft 15 may be made to rotate in either direction. Both in this and other forms of construction, some of which are described hereinafter, the free and fixed pinions and the output wheel may be duplicated where a considerable torque is required to be transmitted via either one or both intermediate shafts.

The gear unit may be driven by one, two or more prime movers by way of a single or multiple reduction or speed increasing train and/or by way of a variable ratio gear, all of which may be incorporated in the same casing as the gear unit.

Similarly the output shaft may be followed by a single or multiple reduction or speed increasing train, and/or variable speed gear which also may be incorporated in the same casing as the gear unit.

Alternatively to the construction shown in Figure 1, the pinions which are free on their respective intermediate shafts may be those engaging the common toothed wheel 16 as shown in Figure 2 at 17a, 17b, while the interengaging pinions 18a, 18b are fast on their respective intermediate shafts, the clutches 19a, 19b being provided between the output pinions 17a, 17b and their respective intermediate shafts. It can be seen that the direction of rotation of the output shaft 15 may be selected by the alternative engagement of the clutches 17a, 17b in the same way as is possible with the construction shown in Figure 1. Furthermore, as shown in Figure 3, the input pinion 11a may be free on the intermediate shaft 10a and be provided with the clutch 13a, while the output pinion 12a is fast on this shaft and the input pinion 18b is fast on the intermediate shaft 10b and the output pinion 17b is free on this shaft and is provided with a clutch 19b. The alternative diagonal arrangement is also suitable.

It will therefore be seen from the constructions shown in Figures 1 to 3 of a single unit arrangement that the two input pinions are in constant mesh and rotate in opposite directions, while the output pinions are in constant mesh with the common toothed wheel 16 and that a clutch means is provided in each intermediate shaft, so that the drive between the pinions on each intermediate shaft by way of the shaft, may be made or interrupted depending on which of the two output pinions are required to impart a drive to the output toothed wheel.

Figure 4 shows a gear unit having three intermediate shafts 10a, 10b, 10c with three input pinions 11a, 11b, 11c with clutches by which they may be connected with the intermediate shafts either alone or as a pair when the drive is required to be split in one direction of drive by pinions 11a, 11c, while the drive in the opposite direction is by way of pinion 11b alone. By this means the torque is not carried by one pinion alone in one direction but is split over two pinions and the output toothed wheel 16 on the output shaft 15 receives its pressure at two points on its circumference. This particular feature offers advantages from the point of view of smallness of size of the clutches and pinions and long life arising from low loading. Where four intermediate shafts are used the torque can be split in both directions of rotation, it being necessary of course that those pinions driving in one direction should be all the same size. It is not necessary that the clutches be associated with the input pinions as they may be in the output pinions or two in one and one in the other as was described in reference to Figures 2 and 3, but it is necessary that the clutches be suitable, namely, friction clutches of restricted torque capacity.

When it is required to have two alternative speed ratios in one direction of drive in, for example, a unit having three intermediate shafts the input set of pinions is duplicated as shown in Figure 5 in which the input pinions 11a, 11b, 11c are all of the same diameter, while pinions 20a, 20c are of the same diameter and different from the pinion 20b. The pinion 20b is fixed to the pinion 11b and is free of the shaft 10b and is connected simultaneously thereto with the pinion 11b when the clutch 13b is engaged. When, therefore, clutch 13b is engaged alone, the drive is in one direction by way of the intermediate shaft 10b, while either of the clutches 13a, 13c are engaged or 20a and 20c are engaged, the drive is split by way of the outer intermediate shafts 10a, 10c in the reverse direction and are of different speed ratios in the two cases.

When it is required to drive the output shaft by means of two prime movers on opposite ends thereof, the arrangement of two units driving one common output toothed wheel may be employed as shown in Figure 6. The common output toothed wheel 16 on the output shaft 15 has a set of input pinions 11a, 11b, 11c to one side similar to the arrangement shown in Figure 4, and a further set of pinions 11a, 11b, 11c to the right of the wheel and similar to that of the left set, while the output pinions 12a, 12b, 12c of the two units may be separate and engage a common output toothed wheel separately or be combined as shown in Figure 6. Also, the intermediate shafts 10c, 10b, 10a to the right of the figure may be extensions of the intermediate shafts 10a, 10b, 10c respectively to the left of the figure. The left set of input pinions is driven by way of the input shaft 14 and the right set by way of the input shaft 14a. This necessitates the two prime movers being of opposite hand, and to obviate this necessity the input shaft may alternatively be connected to one of the side input pinions as shown at 14b, in which case right handed prime movers may be used.

If it is required that right handed prime movers be placed in alignment with one another then the layout shown in Figure 7 may be used, for, when the centre clutches 13b for example are engaged, the intermediate shafts to which they are connected rotate in opposite directions and consequently the shafts to which the prime movers are connected rotate in opposite directions, i. e. the prime movers are of the same hand.

In order that the torque transmitted to the output toothed wheel should be divided over a greater periphery of the output toothed wheel, the gear units may be entirely separate and their output pinions can be interleaved and make separate drives with the output wheel as shown in Figure 8, in which the alternative position of drive from one of the prime movers is shown at 14b.

Figure 9 is an end view of a double unit arrangement looking from the input end, in which each unit is that shown in Figure 4, or Figure 4 modified by re-positioning of the clutches as described in reference to that figure. The two input shafts 14 are arranged on diametrically opposite sides of the output toothed wheel 16 as would be required in a ship having prime movers positioned side by side and driving a single propeller shaft from the output shaft 15. As all the output pinions are of the same size the intermediate shafts are mounted so as to lie on a circle concentric with the output shaft. As all the driven pinions are in engagement with the output toothed wheel they will rotate together in the same direction, while as the input pinions engage one another in each unit they rotate alternately in opposite directions and thus all pinions are in rotation at the same time.

Power is transmitted from the input to output shaft only if one at least of the clutches is placed in engagement, thus causing both pinions on one shaft to be drivingly connected so as to transmit the torque.

As previously mentioned the drive from the prime mover to the set of input pinions may be indirect, i. e. through a train of gears, and such an arrangement is shown in Figure 10, in which the common output wheel 16 is driven by the output pinions 12a, 12b, 12c while the input pinions are the pinions 11a, 11b, 11c. The larger pinions 21a, 21c are fixed to the input pinions 11a, 11c and are themselves driven by a common driving pinion 22 on the input shaft 23. Where two prime movers are used with a diametrically positioned arrangement of two units, the driving pinions 22 may be positioned to the extreme sides to avoid fouling one another, similar to the arrangement of Figure 11, where, instead of the driving pinions engaging the two large pinions 21a, 21c connected to the input pinions 11a, 11c, a large pinion 21b is connected to the input pinion 11b. For any given direction of drive by the prime movers the output shafts of Figures 10 and 11 rotate in opposite directions.

Where it is required to split the drive between one input shaft and two units driving a common output toothed wheel the arrangement may be as shown in Figure 12, where the driving pinion 22 engages the large pinions 21a, 21c of both units or alternatively the driving pinion 22 engages the large pinion 21b of both units as shown in Figure 13. The input shaft in both these cases is coaxial with the output shaft.

The input set of pinions in a unit may have pinions of different sizes, so that different ratios of drive may be obtained by way of different intermediate shafts. Such a possibility is shown in Figure 14. Driving pinion 22 drives the input pinion 11c which engages the adjacent input pinion 11d which is the same diameter and therefore the two intermediate shafts rotate at the same speed, and as the two output pinions 12c, 12d are of the same diameter the output shaft rotates at the same speed in alternative drives by way of the intermediate shafts but in opposite directions. The input pinion 11e is larger than 11d and rotates its intermediate shaft slower than that of 11d, but in the same direction as that of 11c. On the other side of the pinion 11c both pinions 11a and 11b are different in diameter from pinion 11c and two different speed ratios are obtained. Furthermore the output pinions 12a, 12b, 12e are all smaller than the output pinions 12c, 12d and therefore further speed reduction is provided.

This gear therefore provides three speed ratios in one direction of drive and two in the other. From this it is plain that in all constructions hereinbefore described that different speed ratios may be obtained by making the input pinions or output pinions or both of different sizes, and that a plurality of input pinions may be provided in one unit, the number being limited only by the physical size of the gear.

As there are always alternative paths by way of which the drive may be transmitted from the input to the output shaft and as all gears are always in mesh, a control valve is desirable which will ensure that pressure oil is admitted only to the required clutches at any one time, since the effect of locking several clutches corresponding to different speeds or to different directions of drives would result in mechanical damage.

Where several prime movers are employed to drive the same set of or appropriate sets of input pinions, it is necessary to provide each prime mover with an isolating clutch, which may be either part of the gear already described or may be additional to it.

All the input pinions need not be attached to shafts and pinions on the driven side of the gear. Only such shafts need be installed as are required to give the requisite speeds and directions for the particular services of that individual transmission.

The various shafts, which are mounted in stout bearings inside a casing in a circular pattern and which have at one end a driving pinion and at the other a driven pinion, have deep holes or oil channels drilled through the shafts. These oil ways communicate at one end with a control valve which admits oil under pressure into the channels, and at the other end by means of a radial orifice in the shaft communicating with the inner chamber of the pressure clutches. These pressure clutches are generally housed each within the pinions. The clutches, which are friction operated by oil pressure may be plain, grooved or conical on their engagement faces.

The improved change gear is suitable for use in single or multiple engined marine craft having one or more propeller shafts and is also applicable to locomotives and other heavy land vehicles.

It is to be understood that the embodiments of the invention hereinbefore described are by way of example only and that various modifications may be incorporated and the details for carrying the invention into effect may be varied without departing from the scope of the invention.

I claim:

1. Power transmission gear comprising at least one unit comprising three parallel intermediate shafts, an input pinion on each intermediate shaft engaging at least one other such input pinion, an output pinion on each intermediate shaft free of other such output pinions, friction clutch means on each intermediate shaft for drivingly connecting a pinion with said intermediate shaft combined with an output shaft having thereon a common output toothed wheel with which the said output pinions on the intermediate shafts engage and an input shaft driving directly one of the input pinions, all of the pinions not associated with clutch means being fast on their respective shafts.

2. Power transmission gear comprising at least one unit comprising three parallel intermediate shafts, two input pinions on each intermediate shaft engaging at least one adjacent such input pinion, an output pinion on each intermediate shaft free of other such output pinions, friction clutch means on each intermediate shaft for drivingly connecting alternatively the two input pinions on each intermediate shaft to their respective shafts, combined with an output shaft having thereon a common output toothed wheel with which the said output pinions on the intermediate shafts engage and an input shaft driving directly one of the input pinions, all of the pinions not associated with clutch means being fast on their respective shafts.

3. Power transmission gear comprising at least one unit comprising three parallel intermediate shafts, two input pinions on each intermediate shaft engaging at least one adjacent such input pinion, an output pinion on each intermediate shaft free of other such output pinions, friction clutch means on each intermediate shaft for drivingly connecting a pinion with said intermediate shaft combined with an output shaft having thereon a common output toothed wheel with which the said output pinions on the intermediate shafts engage and an input shaft driving directly one of the input pinions, all of the pinions not associated with clutch means being fast on their respective shafts.

4. Power transmission gear comprising at least one unit comprising at least two parallel intermediate shafts, two input pinions on each intermediate shaft engaging at least one adjacent such input pinion, an output pinion on each intermediate shaft free of other such output pinions, friction clutch means on each intermediate shaft for drivingly connecting a pinion with said intermediate shaft combined with an output shaft having thereon a common output toothed wheel with which the said output pinions on the intermediate shafts engage and an input shaft driving directly one of the input pinions, all of the pinions not associated with clutch means being fast on their respective shafts.

5. Power transmission gear comprising two units each comprising three parallel intermediate shafts, at least one input pinion on each intermediate shaft engaging at least one other such input pinion, an output pinion on each intermediate shaft free of other such output pinions, friction clutch means on each intermediate shaft for drivingly connecting a pinion with said intermediate shaft, combined with an output shaft having thereon a common output toothed wheel with which the said output pinions on the intermediate shafts engage and an input shaft driving directly one of the input pinions, all of the pinions not associated with clutch means being fast on their respective shafts.

6. Power transmission gear comprising at least one unit comprising three parallel intermediate shafts, at least one input pinion on each intermediate shaft engaging at least one other such input pinion, an output pinion on each intermediate shaft free of other such output pinions, friction clutch means on each intermediate shaft for drivingly connecting a pinion with said intermediate shaft, combined with an output shaft having thereon a common output toothed wheel with which the said output pinions on the intermediate shafts engage and an input shaft having a pinion thereon driving two of the input pinions all of the pinions not associated with clutch means being fast on their respective shafts.

7. Power transmission gear comprising two units each comprising three parallel intermediate shafts, an input pinion on each intermediate shaft engaging at least one other such input pinion, an output pinion on each intermediate shaft free of other such output pinions, friction clutch means on each intermediate shaft for drivingly connecting a pinion with said intermediate shaft, combined with an output shaft having thereon a common output toothed wheel with which the said output pinions on the intermediate shafts engage an input shaft means having driving means thereon driving at least one of the input pinions, all of the pinions not associated with clutch means being fast on their respective shafts.

References Cited in the file of this patent

UNITED STATES PATENTS

| | | |
|---|---|---|
| 2,209,010 | Wallis | July 23, 1940 |
| 2,427,135 | Guier | Sept. 9, 1947 |
| 2,505,853 | De Pew | May 2, 1950 |
| 2,661,633 | Suberkrub | Dec. 8, 1953 |
| 2,787,167 | Schwab | Apr. 2, 1957 |